United States Patent [19]
Whited

[11] Patent Number: 4,643,294
[45] Date of Patent: Feb. 17, 1987

[54] GRAIN CONVEYOR-TOTAL ENCLOSED

[76] Inventor: Jerrel Whited, 2041 Crawford Dr., Walla Walla, Wash. 99362

[21] Appl. No.: 733,070

[22] Filed: May 13, 1985

[51] Int. Cl.⁴ .............................................. B65G 45/00
[52] U.S. Cl. .................................... 198/498; 198/561; 198/569; 198/580
[58] Field of Search ............... 198/498, 561, 569, 580, 198/598, 637, 828, 842, 860.3, 861.1, 529, 537, 367, 588, 494, 830; 474/181

[56] References Cited

U.S. PATENT DOCUMENTS

| Re. 13,434 | 6/1912 | Edison | 198/561 X |
|---|---|---|---|
| 474,592 | 5/1892 | Edison | 198/569 X |
| 1,863,562 | 6/1932 | Cannon | 198/580 X |
| 2,232,623 | 2/1941 | Neuman | 198/842 X |
| 2,710,683 | 6/1955 | McClenny, Jr. | 198/861.1 X |
| 2,780,368 | 2/1957 | Hickey et al. | 198/569 X |
| 2,931,521 | 4/1960 | Hartley | 198/637 X |
| 3,055,229 | 9/1962 | Mecham | 198/494 X |
| 3,292,773 | 12/1966 | Keehart et al. | 198/860.3 X |
| 3,809,211 | 5/1974 | Padilla | 198/580 X |
| 3,848,743 | 11/1974 | Danberg | 198/494 X |
| 3,944,054 | 3/1976 | Ensinger | 198/861.1 X |
| 3,972,414 | 8/1976 | Conrad | 198/842 X |
| 4,230,222 | 10/1980 | Clark | 198/580 |

FOREIGN PATENT DOCUMENTS

| 1147888 | 4/1963 | Fed. Rep. of Germany | 198/367 |
|---|---|---|---|
| 2357353 | 5/1975 | Fed. Rep. of Germany | 198/498 |
| 2525570 | 10/1983 | France | 198/588 |
| 58-157639 | 9/1983 | Japan | 198/561 |

*Primary Examiner*—Joseph E. Valenza
*Assistant Examiner*—Jonathan D. Holmes
*Attorney, Agent, or Firm*—Paul H. Gallagher

[57] ABSTRACT

An endless belt conveyor having a pulley at the tail end with slats forming slots therebetween leading to an interior space, the latter leading axially outwardly, and the pulley having end plates with radial vanes leading radially beyond the slats. The conveyor has a casing with telescoping sections that are relatively adjustable to accommodate variations in belt lengths. It also has trougher rolls mounted on the side walls of the casing, leaving the bottom portion of the interior space clear. It also includes an intermediate discharge unit which includes a pair of relatively displaced rolls, on which the upper belt run travels, which throws the grain in a suspended path, and deflector blades interposed in the suspended path which deflect the grain laterally into a discharge chute.

8 Claims, 11 Drawing Figures

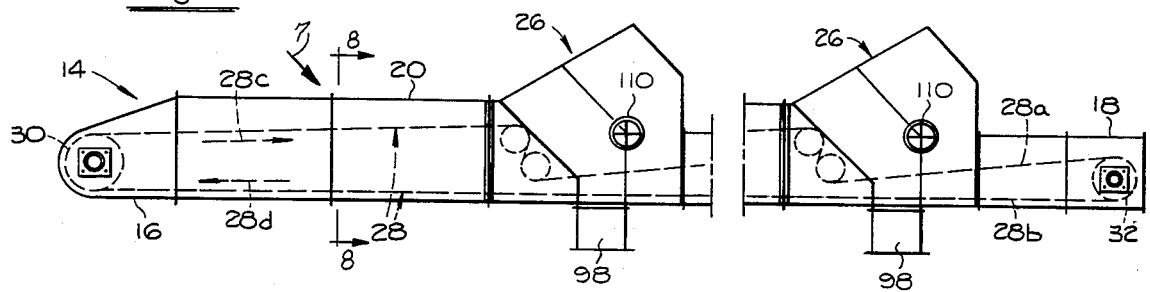
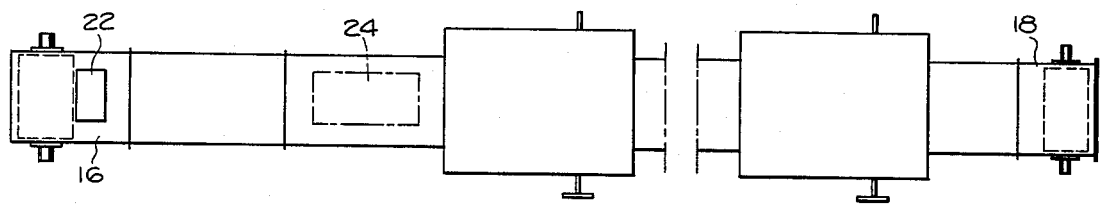
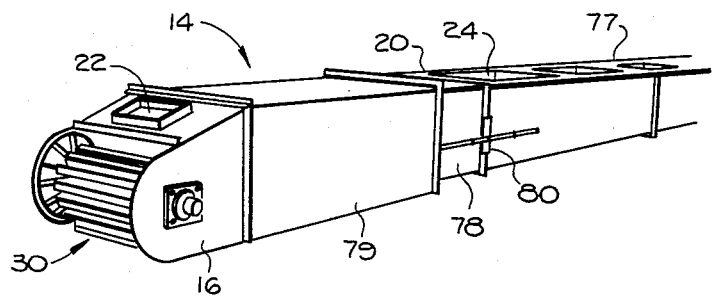
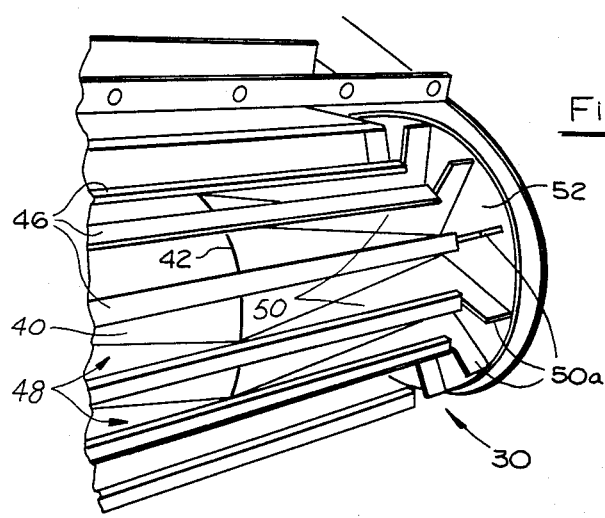

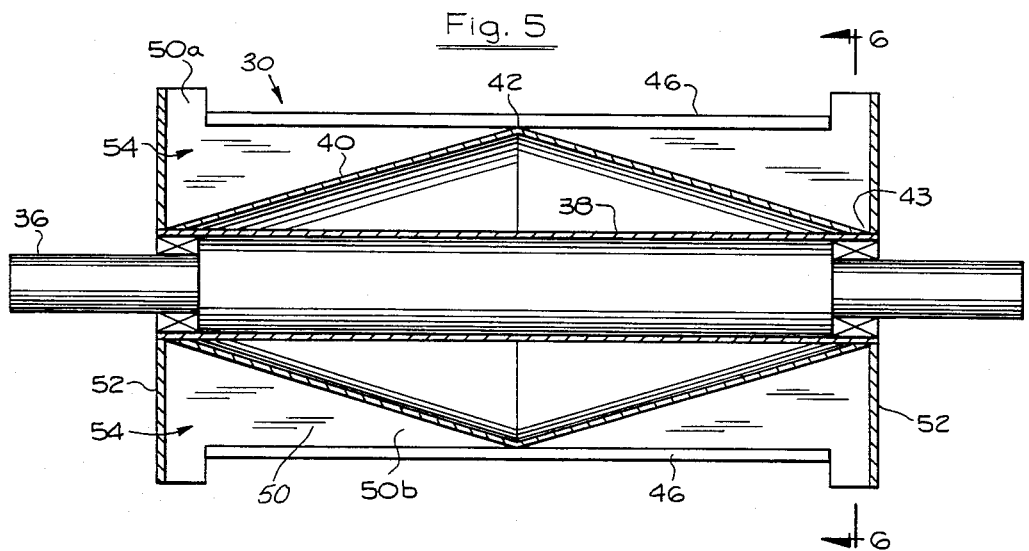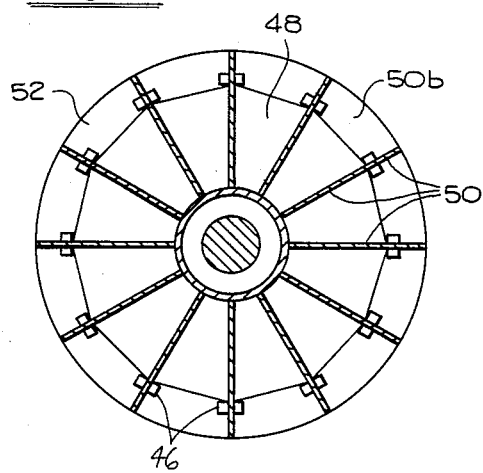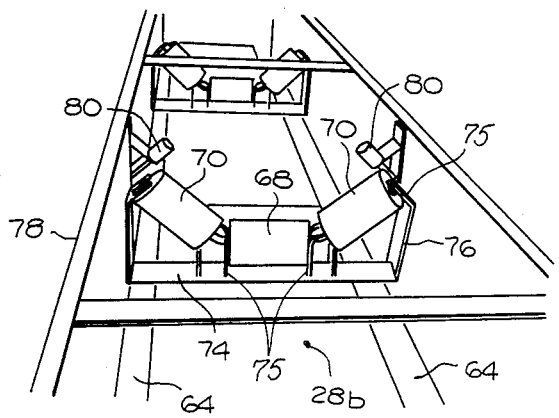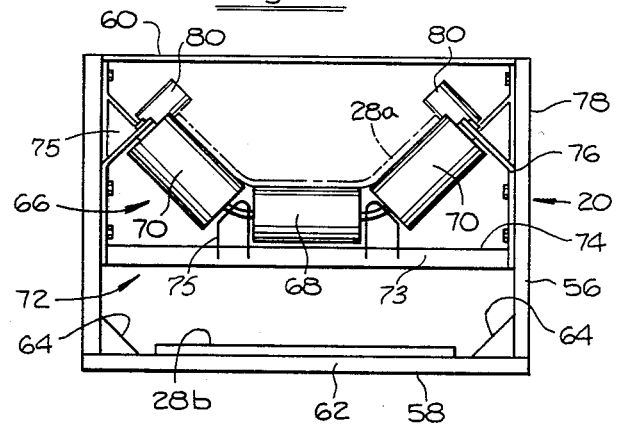

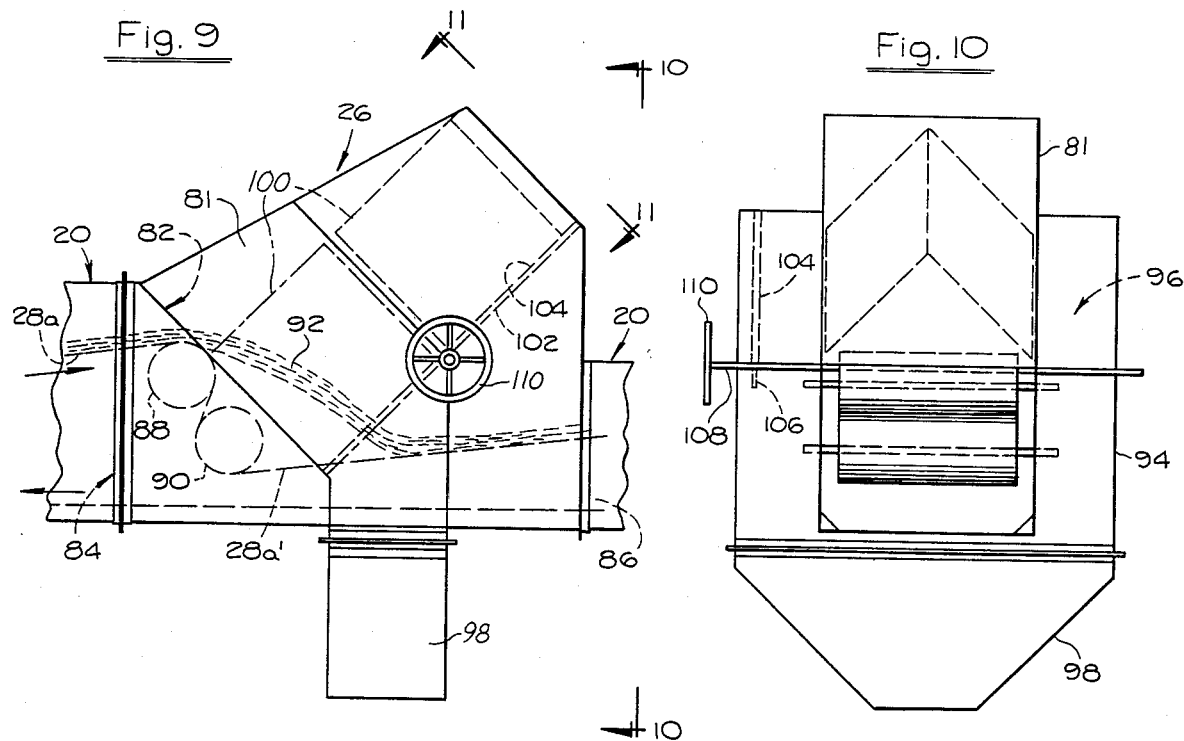

GRAIN CONVEYOR-TOTAL ENCLOSED

FIELD OF THE INVENTION

The invention relates to a grain conveyor of the kind known as a total enclosed belt conveyor. It is used primarily for handling grain and includes an endless belt for carrying the grain, enclosed in a casing for confining dust and dirt that often is carried with the grain. Among the problems involved in connection with such a conveyor, are replacing the grain that has fallen off of the upper run of the belt, back onto that run, and discharging the grain selectively from the conveyor at one or more positions along the length of the belt, it being otherwise discharged at the delivery end of the conveyor.

OBJECTS OF THE INVENTION

A broad object of the invention is to provide an endless belt grain conveyor of the total enclosed belt type, of novel character having the following features and advantages:

1. It includes a special pulley construction supporting one end of the endless belt, effective for collecting and lifting grain that has dropped or spilled off the top run of the belt, carrying it back up onto that run.

2. It has a novel construction of casing operable with the lower run of the belt for carrying grain that has spilled from the upper run, to the special pulley, and thus cooperating with the latter in so carrying the grain to the upper run.

3. It includes a special mounting of the trougher rolls in the casing for facilitating cooperation between the casing and the lower run, referred to.

4. It includes a novel construction for discharging the grain from the endless belt selectively at one or more positions along the length of the endless belt, short of the normal delivery end thereof.

5. It includes a novel construction for tightening the endless belt.

DESCRIPTION OF A PREFERRED EMBODIMENT

In the drawings,

FIG. 1 is a side elevational view of a grain conveyor embodying the features of the invention;

FIG. 2 is a top view of the conveyor;

FIG. 3 is a fragmentary perspective view of the left end portion of FIGS. 1 and 2 with a portion of the casing removed;

FIG. 4 is a fragmentary perspective view of a portion of the tail end of the conveyor, showing the special conveyor pulley;

FIG. 5 is an axial sectional view of the special pulley of FIG. 4;

FIG. 6 is an axial cross sectional view of the special pulley, taken at line 6—6 of FIG. 5;

FIG. 7 is a perspective view of the interior of the conveyor, with the belt removed, taken at substantially the position of the arrow 7 of FIG. 1;

FIG. 8 is a vertical transverse sectional view of the conveyor taken at line 8—8 of FIG. 1;

FIG. 9 is a large scale side elevational view of an intermediate discharge section of the conveyor;

FIG. 10 is a view taken at line 10—10 of FIG. 9;

Fig. 11 is a diagramatic view, showing only certain elements, oriented according to line 11—11 of FIG. 9.

The conveyor disclosed herein is ordinarily used for conveying grain, although it is not limited thereto, and may convey any of a wide variety of materials. Because of its usual recognition as a grain conveyor, it will be referred to herein as such, and that expression will be considered a generic designation.

Referring in detail to the drawings, the conveyor is indicated as a whole at 14 and is shown in its entirety in FIGS. 1 and 2. The conveyor has a tail end 16 and a head end 18, and includes a casing 20 enclosing the moving parts, including the endless belt and is provided with top openings 22, 24 for the insertion of grain thereinto. The conveyor is constructed for delivering the grain through the head end 18, or terminal end, but it also includes one or more discharge units or constructions 26, embodying special features of the invention, for discharging grain at intermediate points, short of the head end 18, all of which will be described in detail hereinbelow. The conveyor is shown here as horizontal, although it may be positioned at a substantial angle from the horizontal.

The grain conveyor includes the usual endless belt 28, having upper and lower runs 28a, 28b respectively, and is trained over a pulley 30 at the tail end and a pulley 32 at the head end. The pulley 30 is of special construction as will be referred to again hereinbelow, while the pulley 32 may be of desired construction of known kind.

The conveyor belt is known as endless, but is referred to as having an inlet end or entry end, at the tail section, and a delivery end or exit end at the head end.

The upper run 28a of the belt is carried by trougher rolls (FIGS. 7 and 8) and the lower run 28b rides on a flat surface of the casing. These components will be referred to again hereinbelow.

Attention is directed to the special pulley 30 at the tail end of the conveyor. This pulley cooperates with the endless belt in picking up grain that is spilled from the upper run. The pulley rotates in clockwise direction as viewed in FIG. 1, the runs of the belt moving in the directions indicated by arrows 28c, 28d.

The special pulley 30 is shown in small scale in FIG. 3, and shown in detail in FIGS. 4-6, and includes a shaft 36 by which it is mounted in the casing, in a suitable manner. The pulley itself includes a central tube 38 mounted directly on the shaft and an imperforate central core 40 of double cone shape, having the bases of the cones fitted together and forming a central ridge or large diameter element 42 and it decreases axially outwardly, forming small ends 43 engaging the tube 38 and secured thereto.

A plurality of slats 46 are included in the pulley 30, extending axially, and spaced apart circumferentially, forming slots 48 therebetween. The pulley includes radial vanes 50 secured to the central core 40 and having their radial outer edges in or adjacent a cylindrical surface. The slats are secured to the central core at the center of the latter, and to the vanes. The vanes extend axially beyond the slats, where they have end portions 50a extending radially beyond the slats. End plates 52 are secured to the vanes, the end plates having central holes receiving the shaft 36, but are otherwise imperforate and extend radially to the outermost ends of the vane elements 50a.

The special pulley 30 is considered as having an interior space 54, into which the slots 48 lead, and the interior space continues axially beyond the ends of the slats, and into the spaces 50b between the vane elements 50a.

The slats 46 define an outer belt surface engaged by and supporting the belt, the belt of course being dimensioned transversely not greater than the length of the slats.

In the operation of the special pulley 30, the grain that spills from the upper run is carried back by the lower run (to the left, FIG. 1) and as the belt approaches the special pulley, and continues around it, the grain falls through the slots 48 into the interior space 54, and moves axially outwardly, along the central cone core 40, and into the spaces 50b between the vane elements 50a. As the pulley continues its rotation, the grain that is in the spaces 50b is carried up and around and as the spaces become full, or loaded, the grain in the spaces extends above the upper run on the pulley, and falls out of those spaces onto the upper run.

Attention is directed next to the mounting of the belt 28 in the casing, referred to above. For this construction attention is directed to FIG. 8 showing the casing 20. The casing has side walls 56 and a bottom closure element 58, and a top closure element or cover 60. The bottom element 58 is covered by or lined with an element 62 of plastic material, forming a base or bed on which the lower run of the belt rides. This material has a low coefficient of friction, and is of known kind. At the lower corners, the casing is provided with inclined pieces 64, deflecting the grain inwardly toward the center of the conveyor.

The conveyor has trougher rolls 66 arranged in a plurality of sets (FIG. 7) spaced along the conveyor at suitable intervals, in a known manner. Each set includes a bottom roll 68 and end rolls 70 extending outwardly and upwardly, the upper run 28a resting on these rolls. The mounting of these trougher rolls in the casing constitutes a novel feature of the invention. The trougher rolls are mounted directly on the side walls 56 of the casing by means of a bracket 72 having a bottom crosspiece 74 and upright end pieces 76. Individual roll brackets 75 are mounted on the bottom crosspiece and end pieces, in which the individual rolls are mounted, respectively. In certain of the sets, guide rolls 80 may be included, guidingly engaging the side edges of the belt.

The entire mounting bracket 72 is mounted directly on the casing of the conveyor, to the exclusion of any separate mounting means, such as may be mounted on or reach to the bottom. The mounting brackets 72, with the trougher rolls, are thus positioned above the bottom of the conveyor casing, eliminating any interference with the grain that has spilled from the upper run. This arrangement of trougher rolls and mounting brackets, cooperates with the special pulley at the tail end, in picking up or returning split grain, back up onto the upper run.

The special mounting of the trougher rolls, including the mounting bracket 72, constitutes an additional important feature of the invention. The bracket and the length of the rolls are pre-selected according to the desired dimensions of the conveyor, i.e., for a narrower conveyor, or wider conveyor, according to desired capacity. The preselection of the mounting bracket 72 and the length of the rolls constitutes a minor component of calculation and construction of the conveyor, providing great simplicity therein.

The conveyor includes a construction of telescoping casing sections for tightening the endless belt, and accommodating variations in length therein. Referring to FIG. 3, the casing 20 includes a main length or portion 77 having a rear element 78 without a flange, which slidingly fits into the section 79. Adjusting means 80 is connected between the sections 78, 79 for adjustably positioning them and thereby varying the tension on the endless belt.

The intermediate discharge unit or station indicated in its entirety at 26, is shown in detail in FIGS. 9-11. As an overall function of the unit, it enables selective discharge of the grain at an intermediate point, between the tail end and head end, without modifying the operation of the belt, for the purpose, and is accomplished by a simple adjustment of a component within the unit.

The unit 26 includes shell or casing 81 defining an interior space 82 and having an inlet opening 84 and an exit opening 86. The unit 26 is put in position by interposing it between sections of the casing 20, and the endless belt 28 passes through the unit. The unit includes a pair of pulleys 88, 90 in the form of rolls, staggered vertically and horizontally relative to the conveyor. The upper run 28a of the belt runs over the upper pulley 88 and then down and under and around the pulley 90, and continues at 28a' at a lower position. The grain indicated at 92 is carried by the upper run 28a as it feeds into the unit 26 and then because of the abrupt downward departure of the belt, the grain is thrown beyond the pulleys onto the belt run 28a' which is at a lower position. In the absence of any interference with this flow of the grain, the grain is carried through the conveyor in a normal way, to the head end of the conveyor, but the discharge unit 26 is operable for deflecting the grain from the belt at this location.

The casing 81 has a wide portion 94 wider than the belt, providing spaces 96 at the sides of the belt, and having a least a portion extending downwardly beyond the belt, where it merges into an outlet conduit or chute 98, leading to a discharge pipe.

Mounted in the casing is a deflector gate 100 which is of inverted V shape (FIG. 11) and is mounted on a slidable support or base 102 including a rack 104. Associated with the rack 104 is a pinion 106, mounted on a shaft 108 on which is a hand wheel 110 on the exterior of the unit, for actuation by the operator. FIG. 9 shows the deflector gate in retracted position, in dotted lines, and in advanced or active position in dot-dash lines, where it extends into the flow of grain indicated at 92. FIG. 11 shows the position of the deflector gate wherein the grain on the upper run 28a emerges from the upper pulley 88 and strikes the deflector gate. The grain then is deflected laterally outwardly and into the spaces 96 where it drops into the discharge chute.

The grain is effectively entirely discharged. A common rate of speed of the conveyor belt is 700 feet per minute, and at this speed, the grain is thrown abruptly as indicated at 92 in FIG. 9, and all of it is deflected laterally as stated. Substantially none of it falls onto the successive segment 28a' of the belt.

These discharge units can of course be interposed at any desired locations within the length of the conveyor, and of course the conveyor can be made of any desired length for accommodating a plurality of granaries.

I claim:

1. A grain conveyor having a tail end and a head end, comprising, an enclosing casing, an endless belt in the casing and a tail pulley and a head pulley operably supporting the belt and adapted for connection of a power source for driving the belt, the endless belt having an upper run normally carrying the grain to be conveyed, and a lower run, and the conveyor being subject to spillage of grain from the upper run, and the lower run thereby tending to carry the spilled grain toward the tail end and to the tail pulley, the tail pulley having radial vanes defining a peripheral belt surface with slots in that surface leading into an interior space opening axially outwardly, the belt and pulley being operable to effect passage of the grain carried by the lower run through said slots into said interior space, and such grain then being capable of passing axially outwardly from the interior space, the pulley including end members secured to the axially outer ends thereof and engaging the vanes throughout the radial extent of the vanes, and the end members and vanes being capable of carrying the grain passing from the interior space up and onto the upper run, in response to rotation of the pulley and the passage of the belt therearound.

2. A grain conveyor according to claim 1 wherein, the vanes include end portions extending both axially and radially beyond the peripheral belt surface.

3. A grain conveyor according to claim 2 wherein, the pulley includes an imperforate central core having a middle portion and tapering toward the ends, and defining the inner limit of said interior space.

4. A grain conveyor according to claim 1 wherein, the pulley includes slats secured to the radial outer edges of the vanes and extending axially thereof and to said end portions, said slats being of substantial width circumferentially of the pulley and thereby being of wider width in that direction than the thickness of the vanes, the slats forming said belt surface.

5. A grain conveyor according to claim 1 that includes trougher rolls for supporting the upper run of the belt, wherein, the casing includes side walls and a bottom element, and brackets for supporting the trougher rolls, each bracket including a pair of opposed vertical elements secured only to the opposite side walls, and constituting the only elements by which the brackets are secured to the casing, a cross piece extending between the vertical elements and secured only to those elements and spaced from the bottom element, the bracket also including individual roll brackets mounting the individual trougher rolls in the bracket.

6. A grain conveyor according to claim 5 wherein, the bottom element of the casing supports the bottom run of the belt, substantially in flat condition throughout the width of the belt, and the casing includes deflector elements secured to the side walls and bottom element operable for guiding grain spilled from the upper run.

7. A grain conveyor according to claim 6 wherein, the deflector elements are positioned with their lowermost points at the bottom element of the casing, and they extend upwardly therefrom.

8. A tail pulley for supporting one end of an endless belt in a conveyor, comprising, a shaft, a double cone core having a large central portion and small ends, radial vanes secured to the core, axially extending slats secured to the vanes distributed circumferentially therearound, defining slots therebetween leading to an interior space, the vanes extending axially beyond the slats, and at positions therebeyond, extending radially therebeyond, and end plates secured to the axially outer ends of the vanes and extending throughout the radial extent of the vanes.

* * * * *